(12) United States Patent
Nagamatsu et al.

(10) Patent No.: US 7,876,480 B2
(45) Date of Patent: Jan. 25, 2011

(54) APPARATUS, METHOD, AND COMPUTER PROGRAM FOR PROCESSING INFORMATION

(75) Inventors: Tatsuo Nagamatsu, Tokyo (JP); Kunitoshi Shimizu, Kanagawa (JP); Takao Okuda, Tokyo (JP); Tsutomu Teranishi, Tokyo (JP); Hiroshi Kawaguchi, Kanagawa (JP); Atsushi Mitsuzawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1533 days.

(21) Appl. No.: 11/224,962

(22) Filed: Sep. 14, 2005

(65) Prior Publication Data

US 2006/0075431 A1  Apr. 6, 2006

(30) Foreign Application Priority Data

Oct. 4, 2004  (JP)  ............................. 2004-291393

(51) Int. Cl.
*H04N 7/025* (2006.01)
*H04N 7/00* (2006.01)

(52) U.S. Cl. .................. 358/908; 348/700; 725/34; 386/46; 386/52; 386/95

(58) Field of Classification Search .................. 386/46, 386/52, 95, 124–126; 348/700, 701; 358/908; 725/32, 34, 35, 45
See application file for complete search history.

(56) References Cited

U.S. PATENT DOCUMENTS 6,449,021 B1 * 9/2002 Ohta et al. .................. 348/700
6,961,954 B1 * 11/2005 Maybury et al. ............... 725/53
6,993,245 B1 * 1/2006 Harville ....................... 386/46
2003/0123841 A1 * 7/2003 Jeannin ........................ 386/46
2003/0202773 A1 * 10/2003 Dow et al. .................... 386/46

FOREIGN PATENT DOCUMENTS

| JP | 9-161455 | | 6/1997 |
| JP | 2000-57749 | | 2/2000 |
| JP | 2000-165796 | * | 6/2000 |
| JP | 2003-047031 | * | 2/2003 |
| JP | 2003-272358 | | 9/2003 |
| JP | 2004-23589 | | 1/2004 |

OTHER PUBLICATIONS

U.S. Appl. No. 11/240,512, filed Oct. 3, 2005, Nagamatsu et al.

* cited by examiner

*Primary Examiner*—Thai Tran
*Assistant Examiner*—Mishawn Dunn
(74) *Attorney, Agent, or Firm*—Oblon, Spivak, McClelland, Maier & Neustadt, L.L.P.

(57) ABSTRACT

An information processing apparatus includes a selector for selecting removal information concerning contents to be removed, the removal information prepared on a per content basis for the contents to be removed and including a value uniquely determined from data within a data range of whole or part of a content to be removed, a first range that is the data range, and a second range that is a removal range represented by the position of the first range, a detector for detecting a range at a predetermined position within the whole content, having the same range as the first range contained in the removal information selected by the selector and the same value as the value uniquely determined and contained in the removal information, and a remover for removing a predetermined content based on the second range contained in the removal information selected by the selector if the detector detects the range at the predetermined position.

9 Claims, 14 Drawing Sheets

APPARATUS, METHOD, AND COMPUTER PROGRAM FOR PROCESSING INFORMATION

CROSS REFERENCES TO RELATED APPLICATIONS

The present invention contains subject matter related to Japanese Patent Application JP 2004-291393 filed in the Japanese Patent Office on Oct. 4, 2004, the entire contents of which are incorporated herein by reference.

BACKGROUND OF THE INVENTION

1. Field of the Invention

The present invention relates to an apparatus, a method, and a computer program for processing information and, in particular, to an apparatus, a method, and a computer program for precisely removing a commercial (CM) from an entire content that is a mixture of a television program and the commercial.

2. Description of the Related Art

During the replaying of a recorded television program, commercials (CMs) are skipped. Since broadcasting of most of CMs lasts for 15 seconds or 30 seconds, a manual skip method for fast forwarding video for a unit of 15 seconds or 30 seconds is used. Also used is an automatic skip method that automatically fast forwards the video only during a stereophonic broadcasting period in a CM audio mode taking advantage of a difference in audio mode between the CM and a television broadcast program. The CM is different in audio mode from the television program, for example, in bilingual broadcast programs and stereophonic broadcast programs.

Japanese Unexamined Patent Application Publication No. 2000-165796 discloses a technique for automatically skipping, cutting, or identifying a CM. In accordance with the disclosed technique, the occurrence of one of a mute period and a scene change, indicating the start position of a CM, is detected, and the end position of the CM is estimated from the occurrence of the one of the mute period and the scene change.

SUMMARY OF THE INVENTION

A variety of techniques to skip the CM during the playback of the television program have been proposed. With the manual skip technique, each user needs to skip each time a CM starts. It takes time for the user to skip the CM. Since the skip operation is manually performed, a slight time delay takes place from the moment the user recognizes the start of the CM to the manual skip operation. It is difficult to accurately index each television program subsequent to CM skipping.

Some CMs are broadcast in a monophonic sound as a television program is, and thus the CM and the television program are broadcast in the same audio mode. In such a mode, the above-referenced skip method detecting the audio mode difference fails to recognize the CM, and the CM skipping cannot be properly performed.

In accordance with the technique disclosed in Japanese Unexamined Patent Application Publication No. 2000-165796, the occurrence of one of the mute period and the scene change is detected. If one of a mute period and a scene change is detected in the middle of a host program, a portion of the host program subsequent to the one of the mute period and the scene can be recognized as a CM. Conversely, if one of a mute period and a scene change takes place several times within the CM, the CM cannot be correctly recognized.

It is thus desirable to precisely remove a CM in a television program.

In accordance with one embodiment of the present invention, an information processing apparatus, includes a selecting unit for selecting removal information concerning contents to be removed from among a plurality of contents organized in time sequence, the removal information prepared on a per content basis for the contents to be removed and including a value uniquely determined from data within a data range of whole or part of a content to be removed, a first range that is the data range from which the value is determined, and a second range that is a removal range represented by the position of the first range, a first detecting unit for detecting a range at a predetermined position within the whole content, having the same range as the first range contained in the removal information selected by the selecting unit and the same value as the value uniquely determined and contained in the removal information, and a removing unit for removing a predetermined content based on the second range contained in the removal information selected by the selecting unit if the first detecting unit detects the range at the predetermined position.

The information processing apparatus may further include a generating unit for generating metadata representing the position of the predetermined content removed by the removing unit from the contents.

The content to be removed may include a commercial contained in a television broadcast content.

The information processing apparatus may further include a second detecting unit for detecting one of a scene change and a mute period. The first range contained in the removal information is represented by one of the number of scene changes and the number of mute periods. If one of the scene change and the mute period is detected by the second detecting unit, the first detecting unit detects the range at the predetermined position of the whole content, having the same range as the first range represented one by the number of scene changes and the number of mute periods and the same value as the value uniquely determined and contained in the removal information.

The information processing apparatus may further include a storage unit storing the removal information.

The information processing apparatus may further include an update unit for updating the removal information stored in the storage unit by downloading removal information from a server connected via a network.

In accordance with another embodiment of the present invention, an information processing method includes steps of selecting removal information concerning contents to be removed from among a plurality of contents organized in time sequence, the removal information prepared on a per content basis for the contents to be removed and including a value uniquely determined from data within a data range of whole or part of a content to be removed, a first range that is the data range from which the value is determined, and a second range that is a removal range represented by the position of the first range, detecting a range at a predetermined position within the whole content, having the same range as the first range contained in the removal information selected in the selecting step and the same value as the value uniquely determined and contained in the removal information, and removing a predetermined content based on the second range contained in the removal information selected in the selecting step if the range at the predetermined position is detected in the detecting step.

In accordance with yet another embodiment of the present invention, a computer program for causing a computer to process information, includes program code for performing steps of selecting removal information concerning contents to be removed from among a plurality of contents organized in time sequence, the removal information prepared on a per content basis for the contents to be removed and including a value uniquely determined from data within a data range of whole or part of a content to be removed, a first range that is the data range from which the value is determined, and a second range that is a removal range represented by the position of the first range, detecting a range at a predetermined position within the whole content, having the same range as the first range contained in the removal information selected in the selecting step and the same value as the value uniquely determined and contained in the removal information, and removing a predetermined content based on the second range contained in the removal information selected in the selecting step if the range at the predetermined position is detected in the detecting step.

In accordance with embodiments of the present invention, the removal information concerning contents to be removed from among a plurality of contents organized in time sequence is selected. The removal information, prepared on a per content basis, includes the value uniquely determined from data within the data range of whole or part of the content to be removed, the first range that is the data range from which the value is determined, and the second range that is the removal range represented by the position of the first range. The range at the predetermined position within the whole content, having the same range as the first range contained in the removal information selected in the selecting step and the same value as the value uniquely determined and contained in the removal information, is detected. The content based on the second range contained in the removal information is removed if the range at the predetermined position is detected.

In accordance with embodiments of the present invention, a CM is accurately removed if a content to be removed is the CM.

In accordance with embodiments of the present invention, the removal information for use in the removal of the content is updated.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 3:
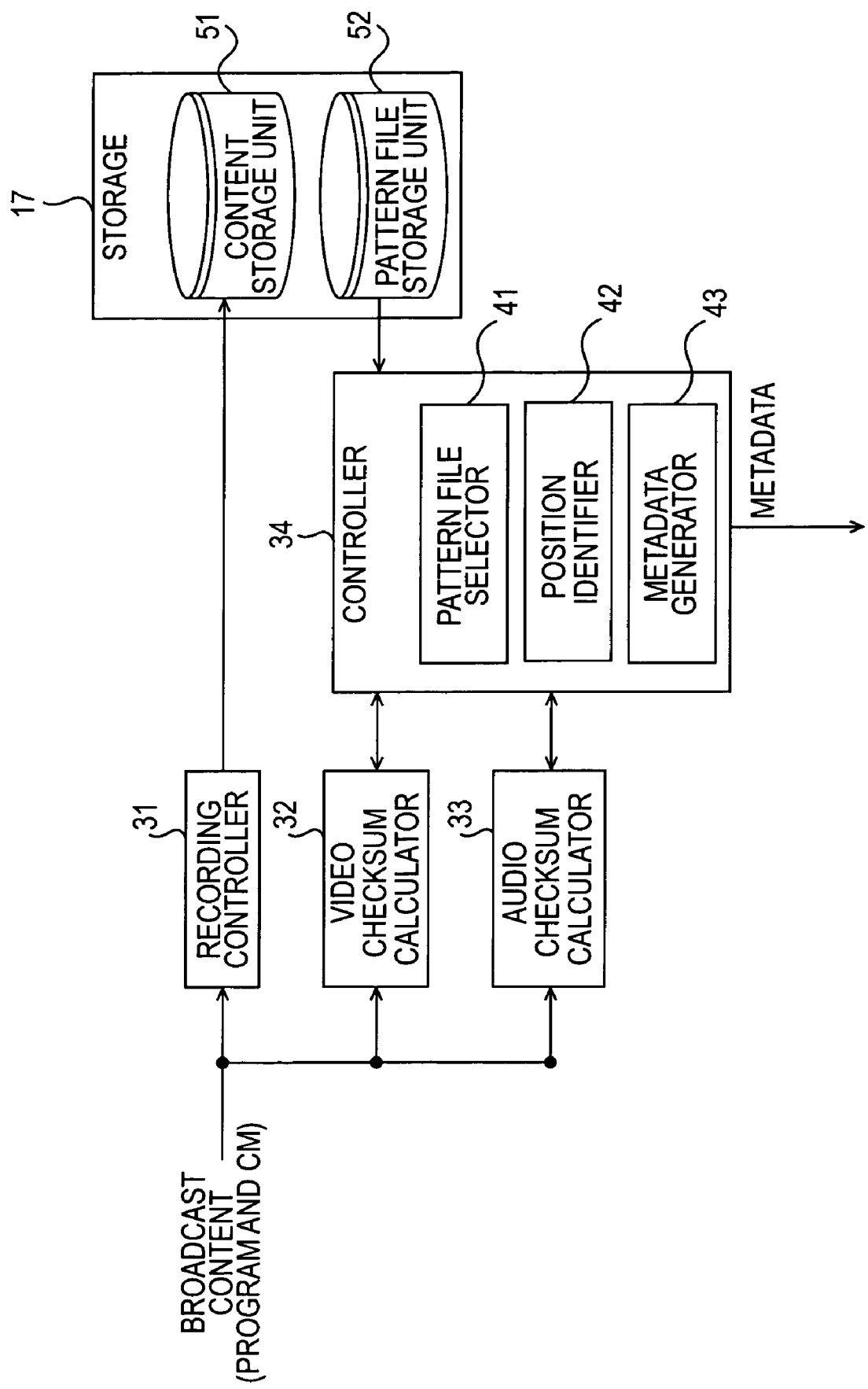
FIG. 3 is a functional block diagram of the information processing apparatus.
Figure 4:
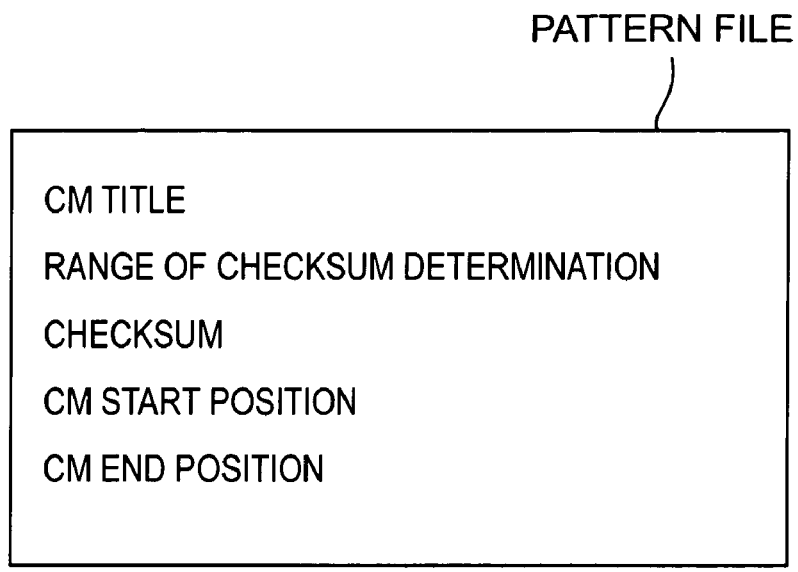
FIG. 4 illustrates a pattern file.

An information processing apparatus of one embodiment of the present invention includes a selecting unit (for example, a pattern file selector 41 of FIG. 3) for selecting removal information (for example, a pattern file of FIG. 4) of contents to be removed from among a plurality of contents organized in time sequence, the removal information prepared on a per content basis for the contents to be removed and including a value (for example, a "checksum" of FIG. 4) uniquely determined from data within a data range of whole or part of the content (for example, a CM), a first range (for example, a "checksum determination range" of FIG. 4) that is the data range from which the value is determined, and a second range (for example, a "CM start position" and a "CM end position" of FIG. 4) that is a removal range represented by the position of the first range, a first detecting unit (for example, a video checksum calculator 32 of FIG. 3) for detecting a range at a predetermined position within the whole content, having the same range as the first range contained in the removal information selected by the selecting unit and the same value as the value uniquely determined and contained in the removal information, and a removing unit (for example, a position identifier 42 of FIG. 3) for removing a predetermined content based on the second range contained in the removal information selected by the selecting unit if the first detecting unit detects the range at the predetermined position.

The information processing apparatus further includes a generating unit (for example, a metadata generator 43 of FIG.

3) for generating metadata representing the position of the predetermined content removed by the removing unit from the contents.

The information processing apparatus further includes a second detecting unit (for example, a scene change detector 61 of FIG. 10) for detecting one of a scene change and a mute period. The first range contained in the removal information is represented by one of the number of scene changes and the number of mute periods. If one of the scene change and the mute period is detected by the second detecting unit, the first detecting unit detects the range at the predetermined position of the whole content, having the same range as the first range represented one by the number of scene changes and the number of mute periods and the same value as the value uniquely determined and contained in the removal information.

The information processing apparatus further includes a storage unit (for example, a pattern file storage unit 52 of FIG. 3) storing the removal information.

The information processing apparatus further includes an update unit (for example, a pattern file manager 91 of FIG. 15) for updating the removal information stored in the storage unit by downloading removal information from a server (for example, a server 81 of FIG. 14) connected via a network.

Figure 6:
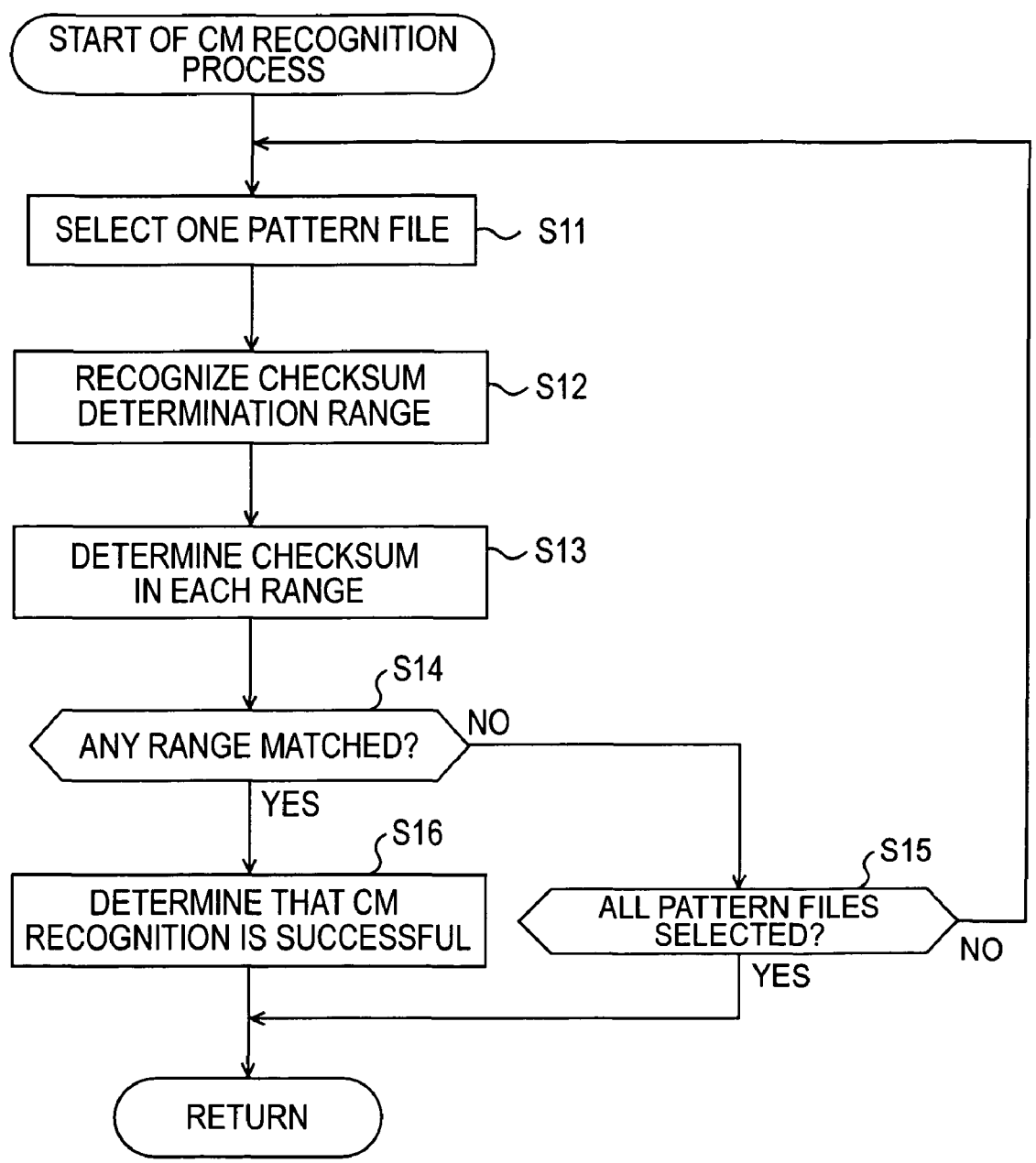
FIG. 6 is a flowchart illustrating a CM recognition process performed in step S1 of FIG. 5.
Figure 7:
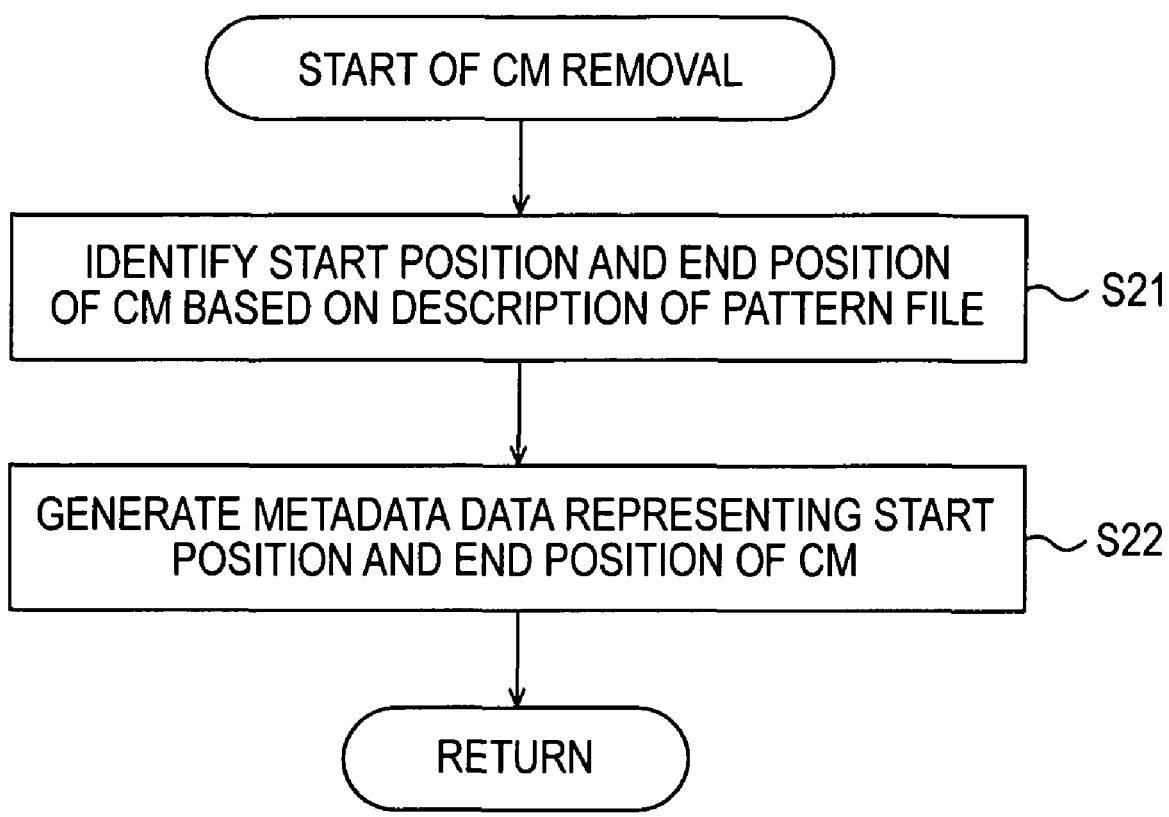
FIG. 7 is a flowchart illustrating a CM removal process performed in step S3 of FIG. 5.

An information processing method of one embodiment of the present invention includes steps of selecting removal information concerning contents to be removed from among a plurality of contents organized in time sequence, the removal information prepared on a per content basis for the contents to be removed and including a value (for example, the "checksum" of FIG. 4) uniquely determined from data within a data range of whole or part of the content (for example, the CM), a first range (for example, the "checksum determination range" of FIG. 4) that is the data range from which the value is determined, and a second range (for example, the "CM start position" and the "CM end position" of FIG. 4) that is a removal range represented by the position of the first range (for example, in step S11 of FIG. 6), detecting a range at a predetermined position within the whole content, having the same range as the first range contained in the removal information selected in the selecting step and the same value as the value uniquely determined and contained in the removal information (for example, in step S13 of FIG. 6), and removing a predetermined content based on the second range contained in the removal information selected in the selecting step if the range at the predetermined position is detected in the detecting step (for example, in step S21 of FIG. 7).

In a computer program of one embodiment of the present invention, the same process steps as those of the information processing method are performed.

The embodiments of the present invention are described below with reference to the drawings.

Figure 1:
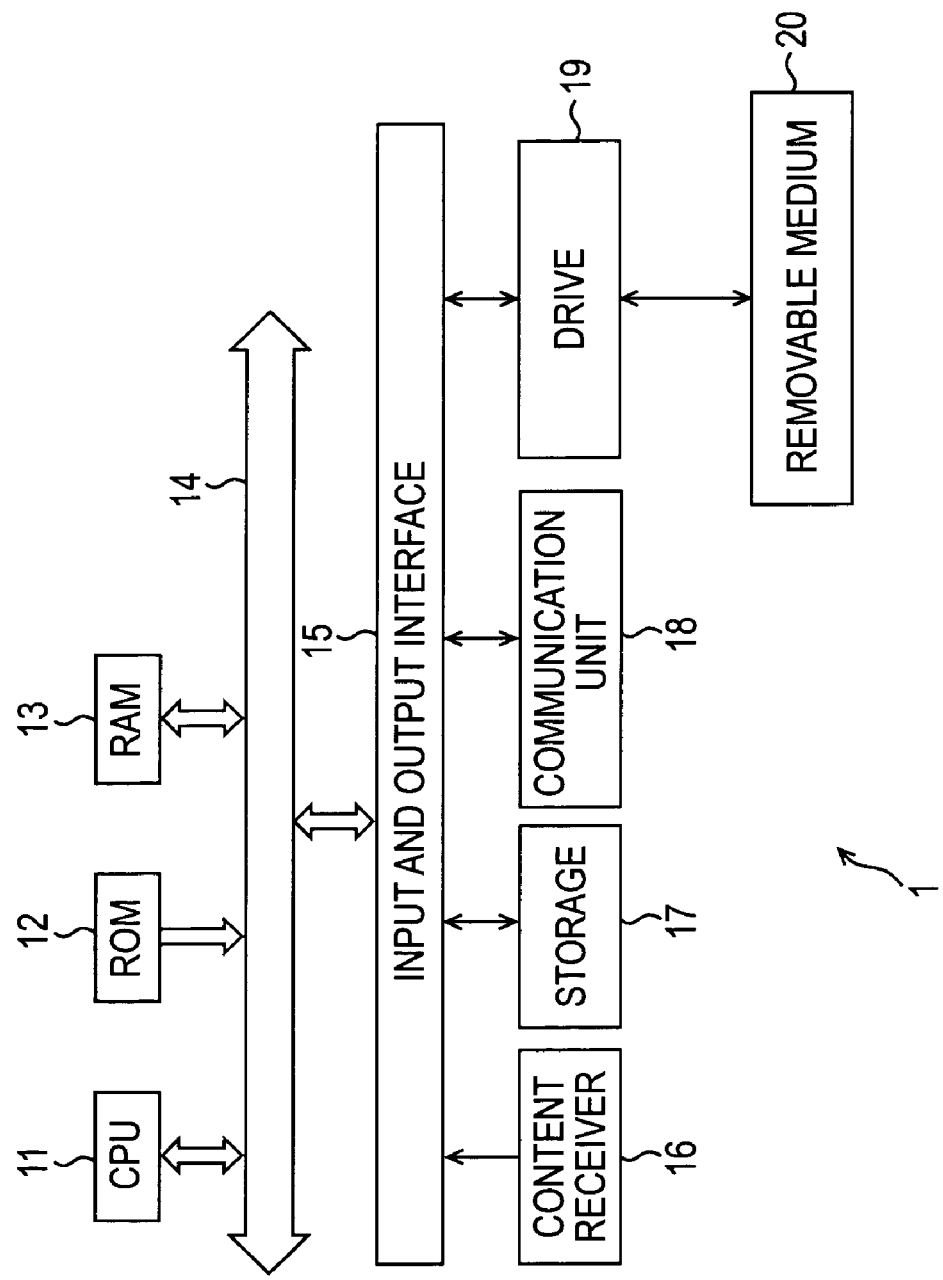
FIG. 1 is a block diagram of an information processing apparatus in accordance with one embodiment of the present invention.

FIG. 1 is a block diagram illustrating an information processing apparatus 1 of one embodiment of the present invention.

A central processing unit (CPU) 1 executes a variety of processes in accordance with one of a program stored in a read-only memory (ROM) 12 and a program loaded from a storage unit 17 to a random-access memory (RAM) 13. The RAM 13 also stores data required by the CPU 11 when the CPU 11 performs the variety of processes.

The CPU 11, the ROM 12, and the RAM 13 are interconnected to each other via a bus 14. The bus 14 also connects to an input and output interface 15.

A content receiver 16 connected to the input and output interface 15 receives a signal supplied from an antenna (not shown), thereby acquiring a broadcast content containing a television program as a host program and a commercial (CM). The antenna receives a variety of digital broadcast waves such as terrestrial digital broadcast programs, and broadcast satellite (BS)/communication satellite (CS) digital broadcast programs. The broadcast content received by the content receiver 16 is supplied to a storage 17 via the input and output interface 15 for storage.

The input and output interface 15 connects to the storage 17 and a communication unit 18.

The storage 17, including a hard disk, stores the broadcast content supplied from the content receiver 16. The broadcast content stored in the storage 17 is read by the CPU 11. The CPU 11 removes a CM from the entire broadcast content. The removal of the CM refers to an operation to allow the entire broadcast content to be handled with a television program portion thereof discriminated from a CM portion thereof.

The communication unit 18 performs a communication process via a network. For example, to remove the CM from the entire broadcast content, the communication unit 18 downloads, from a server connected via the network, a file to be referenced by the CPU 11 (i.e., a pattern file to be discussed later).

A removable medium 20, such as a magnetic disk, an optical disk, a magneto-optic disk, and a semiconductor memory, is loaded onto a drive 19 that is connected to the input and output interface 15 as necessary. A computer program read from the removable medium 20 is installed onto the storage 17. When the broadcast content stored in the removable medium 20, rather than the one received from the content receiver 16, is processed in the information processing apparatus 1, the broadcast content read by the drive 19 is supplied to the storage 17 via the input and output interface 15 for storage.

The information processing apparatus 1 thus constructed removes a CM from the entire broadcast content, and attaches metadata representing a removal position (position of the CM) to the broadcast content. The removal of the CM is performed using the pattern file prepared for each CM.

Described in the pattern file for use in the removal of the CM are a checksum determined from the entire data of the CM (a bit train from the front end to the rear end of the CM), a range of the CM from which the checksum is determined, and a start position and an end position of the CM represented with reference to the checksum determination range. More specifically, the checksum of the CM is determined beforehand in each apparatus, and the pattern file contains the checksum thus described.

Figure 2:
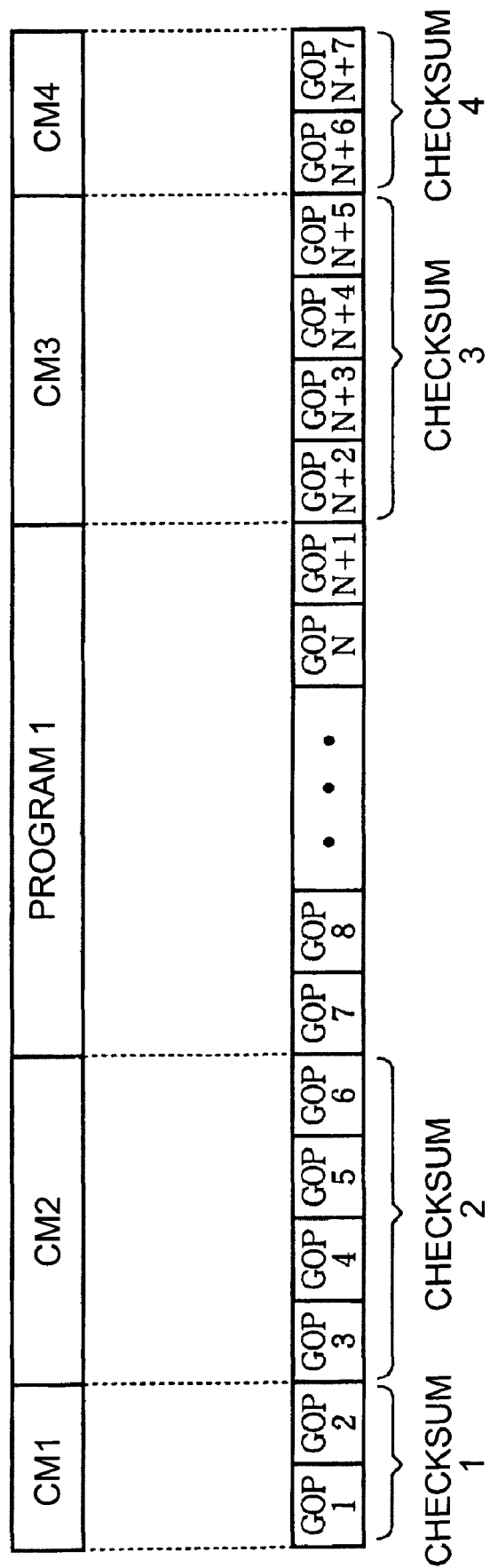
FIG. 2 illustrates a specific example of a start position and an end position of a CM.

FIG. 2 illustrates the CM start position and the CM end position.

As shown in FIG. 2, a broadcast content, complying with the moving picture experts group (MPEG) 2, includes CM 1, CM 2, program 1, CM 3, and CM 4 arranged in time sequence in that order. CM 1 herein includes group of picture (GOP) 1 and GOP 2. CM 2 includes GOP 3 through GOP 6. Program 1 includes GOP 7 through GOP (N+1), CM 3 includes GOP (N+2) through GOP (N+5), and CM 4 includes GOP (N+6) and GOP (N+7). The information processing apparatus 1 has respective pattern files of CM 1 through CM 4.

The information processing apparatus 1 selects the pattern file of CM 1, for example, and identifies the position of CM 1 within the entire broadcast content based on the description of the selected pattern file. More specifically, the range of determining the checksum for detecting CM 1 is written as "2 GOPs" in the pattern file of CM 1. The information processing apparatus 1 determines the checksum based on 2 GOPs as a unit from among GOPs forming the entire broadcast content.

For example, the information processing apparatus 1 determines the checksums based on data of 2 GOPs as a unit, i.e., GOP 1 and GOP 2, GOP 2 and GOP 3, GOP 3 and GOP 4, . . . , and determines whether any of the determined checksums matches the checksum described in the selected pattern file (i.e., "checksum 1" determined from the entire CM 1).

Since the pattern file of CM 1 is selected herein, the checksum 1 described therein matches the checksum determined from GOP 1 and GOP 2 as a unit. The information processing apparatus 1 recognizes GOP 1 and GOP 2 as the GOP's of CM 1. The pattern file of CM 1 contains the description that the range for determining the checksum is a range from the start position to the end position of CM 1 (i.e., the entire CM 1). The information processing apparatus 1 thus determines that the head of GOP 1 is the start position of CM 1, and that the tail of GOP 2 is the end position of CM 1.

The position of CM 2 is now to be identified. The pattern file of the selected CM 2 contains the description that the range for determining the checksum for detecting CM 2 is "4 GOPs". The information processing apparatus 1 determines the checksums based on 4 GOPs as one unit from among GOPs forming the entire broadcast content.

For example, the information processing apparatus 1 determines the checksums from data of 4 GOPs as a unit, i.e., GOP 1 through GOP 4, GOP 2 through GOP 5, GOP 3 through GOP 6, . . . , and determines whether any of determined checksums matches the checksum described in the selected pattern file (i.e., "checksum 2" determined from the entire CM 2).

Since the pattern file of CM 2 is selected herein, the checksum 2 described therein matches the checksum determined from GOP 3 through GOP 6 as a unit. The information processing apparatus 1 recognizes GOP 3 through GOP 6 as the GOP's of CM 2. The pattern file of CM 2 contains the description that the range for determining the checksum is a range from the start position to the end position of CM 2 (i.e., the entire CM 2). The information processing apparatus 1 thus determines that the head of GOP 3 is the start position of CM 2, and that the tail of GOP 6 is the end position of CM 2.

Similarly, the pattern files prepared in the information processing apparatus 1 are successively selected, and the positions of each CM (start position and end position) are identified. When the start position of the CM and the end position of the CM are identified, metadata identifying the start position and end position of the CM are generated.

One pattern file representing a checksum works as a hint for the information processing apparatus 1 to remove a CM.

The generated metadata is used when a CM is skipped during playback of the broadcast content or when a television program (host program) is recorded without CM onto the removable medium 20, such as a digital versatile disk (DVD).

When the start position and the end position of each of CM 1 through CM 4 of FIG. 2 are identified, the portion other than GOP 7 through GOP N+1 is skipped without being played back and only program 1 composed on GOP 7 through GOP N+1 is stored onto the removable medium 20.

The information processing apparatus 1 determines a checksum on a per predetermined unit basis in accordance with the pattern file, and determines whether the determined checksum matches the checksum described in the selected pattern file. The information processing apparatus 1 thus determines the positions of the CM in a more reliable manner than the known technique in which one of a mute period and a scene change is detected and 15 seconds or 30 seconds subsequent to the one of the mute period and the scene change are treated as a CM portion.

If one of the detected mute period and scene change is present within the CM in accordance with the known art, an erroneous position of the CM is identified because a portion of the television program in the broadcast content is also taken into consideration in the position identification. Such an erroneous identification is prevented in the embodiment of the present invention.

A series of process steps of the information processing apparatus 1 identifying the position of the CM will be described later with reference to flowcharts.

FIG. 3 is a functional block diagram of the information processing apparatus 1. At least part of the functions of FIG. 3 is performed by the CPU 11 of FIG. 1 in accordance with a predetermined program.

The recording controller 31 controls the content receiver 16 to select a predetermined broadcast content, and causes a content storage unit 51 in the storage 17 to store the selected broadcast content (containing an audio and video).

A video checksum calculator 32 acquires images (image sequence) of the broadcast content supplied from the content receiver 16, and determines a checksum of an image (an image of GOP unit) within a range specified by the pattern file supplied from the pattern file selector 41 in a controller 34. The checksum determined by the video checksum calculator 32 is output to a position identifier 42 in the controller 34. The image supplied to the video checksum calculator 32 can be the one that is temporarily stored in the content storage unit 51 and read at a predetermined timing.

An audio checksum calculator 33 acquires an audio of the broadcast content supplied from the content receiver 16, and determines a checksum of an audio within a range specified by the pattern file supplied from the pattern file selector 41. The checksum determined by the audio checksum calculator 33 is also output to the position identifier 42.

The position of the CM is identified based on the checksum determined from the image within the predetermined range. The CM position identification process is described below. Similarly, the CM position is identified from the checksum determined by the audio checksum calculator 33 from the audio within the predetermined range.

The controller 34 is composed of the pattern file selector 41, the position identifier 42, and a metadata generator 43.

The pattern file selector 41 selects the pattern files stored in the pattern file storage unit 52 one by one, and outputs the selected pattern file to the video checksum calculator 32.

The position identifier 42 determines whether the checksum calculated by the video checksum calculator 32 matches the checksum described in the currently selected pattern file. If the metadata generator 43 determines that the checksum calculated by the video checksum calculator 32 matches the checksum described in the pattern file, in other words if the video checksum calculator 32 detects an image contained in a CM represented by a start position and an end position in the currently selected pattern file, the position identifier 42 identifies the position of the CM with respect to the start position and the end position in accordance with the description of the pattern file. Information relating to the CM position identified by the position identifier 42 is supplied to the metadata generator 43.

In response to the information supplied from the position identifier 42, the metadata generator 43 generates metadata representing the CM start position and the CM end position. The metadata generated by the metadata generator 43 is supplied to an external application program. The metadata is thus stored with the broadcast content associated therewith, used to play back the broadcast content (with the CM skipped), or to record the broadcast content (only the program portion is recorded).

The storage 17 includes the content storage unit 51 and the pattern file storage unit 52.

The content storage unit 51 stores the broadcast content supplied from the recording controller 31, and the pattern file storage unit 52 stores the pattern file on a per CM basis.

FIG. 4 illustrates the pattern file. The pattern file is described in XML (extensible Markup Language), for example.

A "CM title", a "range of checksum determination", a "checksum", a "CM start position, and a "CM end position" are described in the pattern file.

The "CM title" is the title of the CM with the pattern file thereof representing the start position and the end position of the CM.

The "range of checksum determination" represents a range of data that is used to determine a next "checksum". For example, when the position of the CM is identified based on the checksum determined from the image within a predetermined range, the range is specified by the number of bits, the number of frames, the number of fields, and time in addition to the above-described GOPs.

The "checksum" is the one that is determined beforehand based on the data within the "range of checksum determination" of the CM, with the start position and the end position thereof represented by the pattern file.

The "CM start position" is the CM start position that is determined with respect to the position of the "range of checksum determination". The "CM end position" is the CM end position that is determined with respect to the position of the "range of checksum determination". The CM start position and the CM end position are identified by the number frames, and time, for example. A range from the CM start position to the CM end position is a removal range.

The pattern file containing the above description is prepared on a per CM basis, and stored on the pattern file storage unit 52.

The operation of the information processing apparatus 1 is described below.

A series of process steps of the information processing apparatus 1 is described below with reference to a flowchart of FIG. 5.

In step S1, the information processing apparatus 1 performs a CM recognition process. In this process, the information processing apparatus 1 detects a range, within which the same checksum as the checksum described in the pattern file is determined, from among ranges of the broadcast contents to be processed. If the information processing apparatus 1 detects such a range, a CM recognition is considered successful. The CM recognition process will be described in detail below with reference to a flowchart of FIG. 6.

The information processing apparatus 1 determines in step S2 whether the CM recognition is successful. If it is determined that the CM recognition is successful, processing proceeds to step S3. If the information processing apparatus 1 detects a range within which the same checksum as the checksum specified in the currently selected pattern file is determined, the CM recognition is considered successful.

In step S3, the information processing apparatus 1 performs a CM removal process. In the CM removal process, the information processing apparatus 1 generates the metadata representing the CM start position and the CM end position identified with respect to the range within which the same checksum as the checksum described in the pattern file is determined. The CM removal process will be described in detail below with reference to a flowchart of FIG. 7.

If the CM removal process is completed in step S3, or if it is determined in step S2 that the CM recognition is not successful, processing ends.

These processes are repeated to generate the metadata representing the start positions and the end positions contained in a single broadcast content to be processed.

Figure 5:
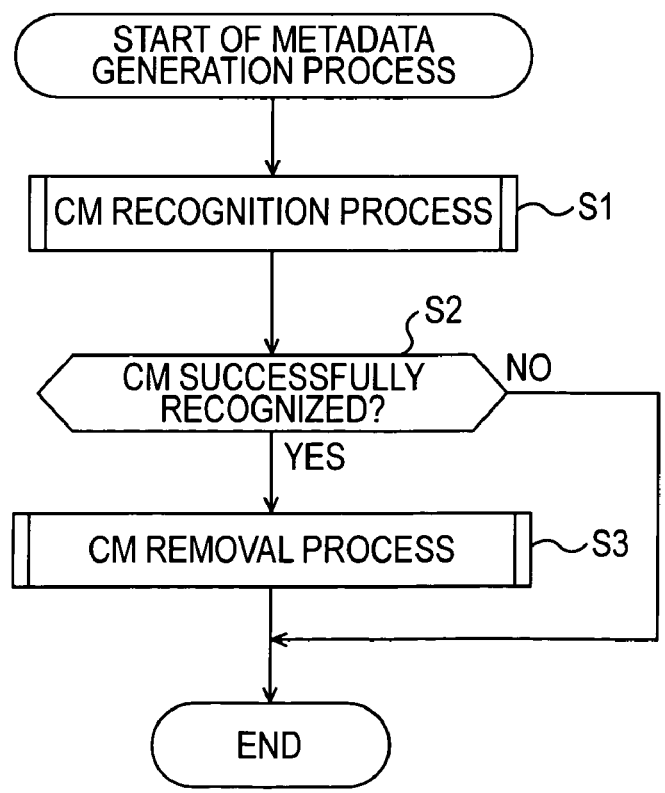
FIG. 5 is a flowchart illustrating a metadata generation process of the information processing apparatus.

The CM recognition process performed in step S1 of FIG. 5 is described below with reference to the flowchart of FIG. 6. The CM position is identified based on the checksum determined from the image within the predetermined range.

In step S11, the pattern file selector 41 in the controller 34 selects one of the pattern files stored in the pattern file storage unit 52, and outputs the selected pattern file to the video checksum calculator 32.

In step S12, the video checksum calculator 32 recognizes the "range of checksum determination" described in the pattern file supplied from the pattern file selector 41. Processing proceeds to step S13 to determine the checksum from the data of the ranges recognized in step S12. For example, if the checksum is determined on a unit of 2 GOPs as the "range of checksum determination", the video checksum calculator 32 calculates the checksum based on data of 2 GOPs as a unit in the entire broadcast content. The determined checksum is output to the position identifier 42.

In step S14, the position identifier 42 determines whether a range, within which the checksum matching the checksum described in the currently selected pattern file is determined, is present among ranges from which the video checksum calculator 32 determines checksums. If the position identifier 42 determines in step S14 that no such range is present, processing proceeds to step S15.

In step S15, the pattern file selector 41 determines whether all pattern files have been selected. If it is determined that all pattern files have not been selected, processing returns to step S11 to repeat step S11 and subsequent steps.

If it is determined in step S15 that all pattern files have been selected, the pattern file selector 41 repeats step S2 and subsequent steps of FIG. 5.

If the position identifier 42 determines in step S14 that a range, within which the checksum matching the checksum described in the currently selected pattern file is determined, is present among ranges from which the video checksum calculator 32 determines checksums, processing proceeds to step S16. The position identifier 42 thus determines that the recognition of the CM (having the start position and the end position identified in the currently selected pattern file) is successful.

Processing proceeds to step S2 to determine that the CM recognition is successful. In step S3, the CM removal process is performed.

The CM removal process performed in step S3 of FIG. 5 is described below with reference to the flowchart of FIG. 7.

In step S21, the position identifier 42 in the controller 34 identifies the CM start position and the CM end position based on the description of the "CM start position" and the "CM end position" with respect to the position of the range from which the checksum matching the checksum described in the pattern file (selected in step S11 of FIG. 6) is determined. The information of the CM start position and the CM end position, identified by the position identifier 42, is output to the metadata generator 43.

If the range from which the checksum matching the described checksum is determined is identical to the range from the CM start position to the CM end position, the position identifier 42 identifies the head of a predetermined number of GOPs (the range from which the checksum is determined) used to determine the checksum, as the CM start position, and the tail of the predetermined number of GOPs as the CM end position.

In step S22, the metadata generator 43 generates the metadata representing the CM start position and the CM end position, identified in step S21. The generated metadata is then output to the external application program. A metadata generation process ends, and processing returns to step S3 of FIG. 5.

In this way, the range used to determine the checksum matching the checksum described in the pattern file is detected from within the entire broadcast content to be processed. The CM start position and the CM end position in the broadcast content are determined based on the position of the detected range and the description of the pattern file. The information processing apparatus 1 thus reliably identifies the CM start position and the CM end position. In digital broadcasting, given the same CM content, the same bit train is acquired even if the same CM content is received at different times and on different channels. As long as the same algorithm for determining the checksum is used, the determined checksums become identical to each other.

Instead of the checksum, another value can be used as long as the value is uniquely determined as a bit train having a predetermined number of bits and is substantially different from data to data (from CM to CM). For example, a hash value determined by applying a predetermined hash function can be used.

As shown in FIG. 2, the checksum determined from the entire CM, like checksum 1 determined from GOP 1 and GOP 2 forming CM 1, checksum 2 determined from GOP 3 through GOP 6 forming CM 2, etc., is used to be compared with the checksum determined in the CM recognition. Alternatively, the checksum determined from a portion of the CM can be used to be compared with the checksum determined in the CM recognition.

Figure 8:
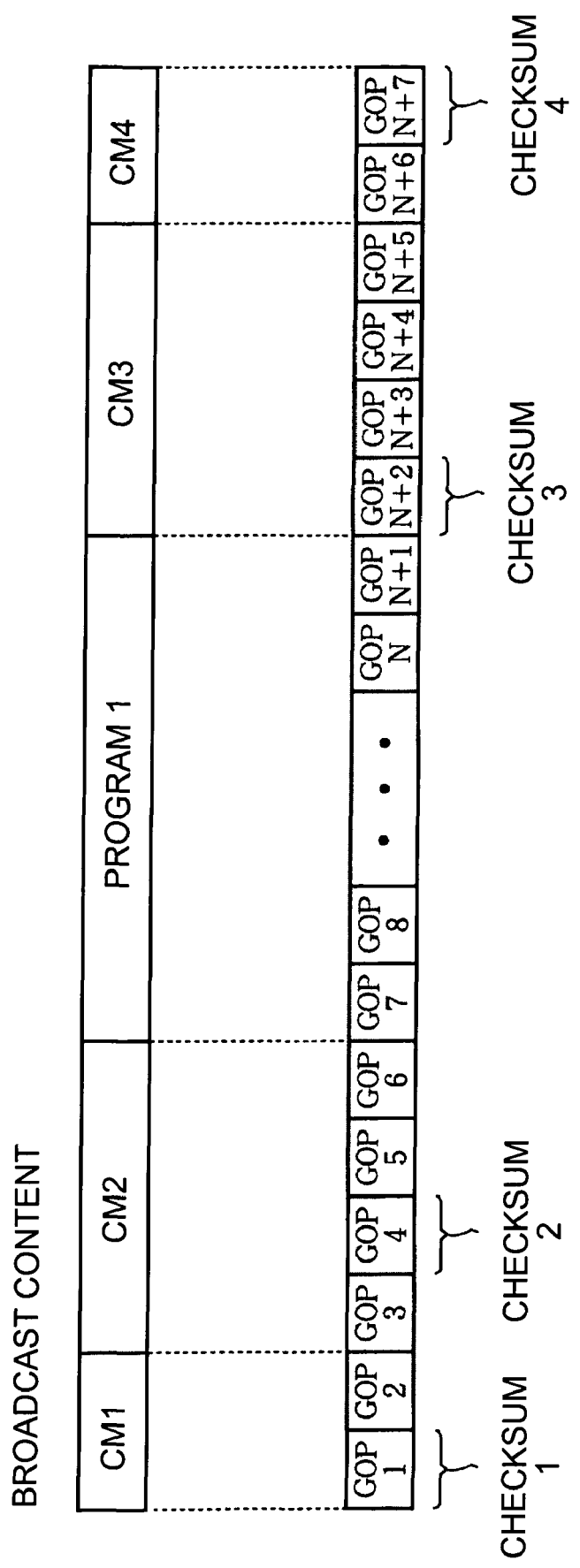
FIG. 8 illustrates another specific example of the start position and the end position of the CM.

FIG. 8 illustrates another specific example of the CM start position and the CM end position.

Unlike the case of FIG. 2, checksum 1 compared to recognize CM 1 (checksum described in the pattern file) is the checksum determined from GOP 1 out of GOP 1 and GOP 2 forming CM 1. Checksum 2 compared to recognize the CM 2 is the checksum determined from GOP 4 out of GOP 3 through GOP 6 forming CM 2.

Checksum 3 compared to recognize CM 3 is the checksum determined from GOP N+2 out of GOP N+2 through GOP N+5 forming CM 3. Checksum 4 compared to recognize CM 4 is the checksum determined from GOP N+7 out of GOP N+6 through GOP N+7 forming CM 4.

The workload imposed on the information processing apparatus 1 is lightened by using the checksum determined from a portion of GOPs out of all GOPs forming the CM as the checksum compared to identify the CM.

When the range to determine the checksum is specified as shown in FIG. 8, the information processing apparatus 1 determines the checksum from each of GOP 1, GOP 4, GOP N+2, and GOP N+7, compares the determined checksum with the checksum described in the pattern file in each of the CM 1 through CM 4. Upon detecting the CM, the information processing apparatus 1 identifies the position of the CM start position and the CM end position represented with respect to the range used to determine the same checksum as the checksum described in the pattern file.

For example, the checksum is determined from each of GOP 1, GOP 4, GOP N+2, and GOP N+7, and the range used to determine the same checksum as checksum 1 compared to recognize the CM 1 is detected as GOP 1. In the pattern file of CM 1, the start position and the end position of CM 1 are described with respect to the position of GOP 1 used to determine checksum 1 in a manner such that the head of GOP 1 used to determine the same checksum as checksum 1 is the start position of CM 1, and the tail of GOP 2, one GOP after GOP 1 in time sequence, is the end position of CM 1. The information processing apparatus 1 identifies the head of GOP 1 as the start position of CM 1 and the tail of GOP 2 as the end position of CM 1.

In the pattern file of CM 2, the start position and the end position of CM 2 are described with respect to the position of GOP 4 used to determine checksum 2 in a manner such that the head of GOP 3, one GOP before the position of GOP 4 used to determine checksum 2, is the start position of the CM 2, and the tail of GOP 6, two GOPs after the position of GOP 4 used to determine checksum 2, is the end position of CM 2. The information processing apparatus 1 identifies the head of GOP 3 as the start position of CM 2 and the tail of GOP 6 as the end position of CM 2.

The information processing apparatus 1 thus detects the range from which the same checksum as the checksum determined from part of the data of the entire CM is detected. With respect to the position of the range, the position of the entire CM is identified from the description of the pattern file.

In the above discussion, the "range of checksum determination" of FIG. 4 is specified by the GOP. Alternatively, the "range of checksum determination" can be specified by the number of scene changes.

Figure 9:
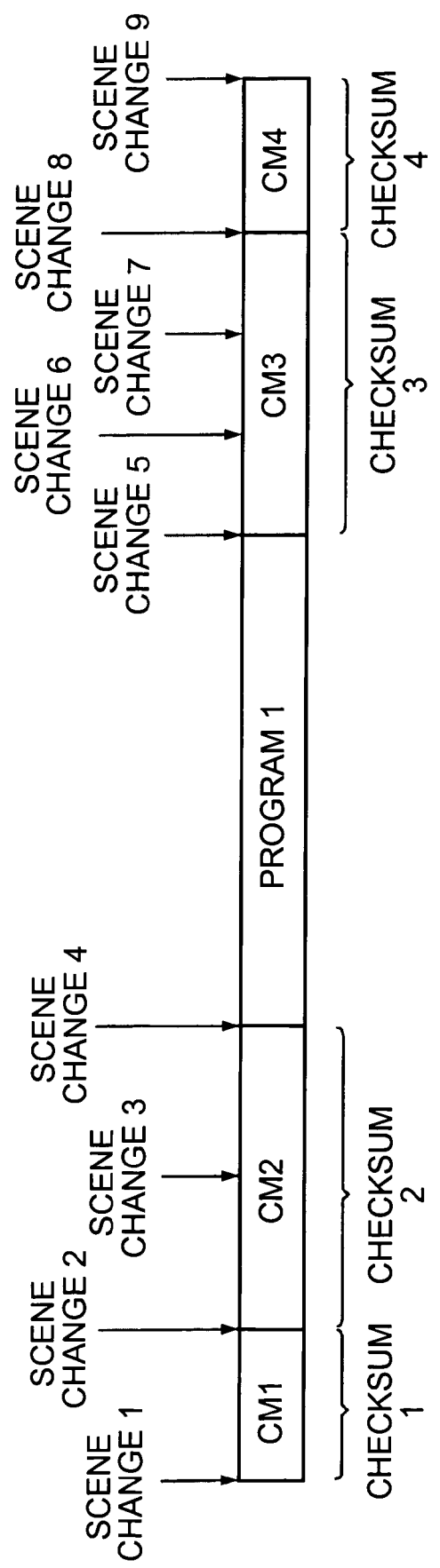
FIG. 9 illustrates yet another specific example of the start position and the end position of the CM.

FIG. 9 illustrates another specific example of the CM start position and the CM end position.

In the broadcast content of FIG. 9, scene change 1 occurs at the head of CM 1, and scene change 2 occurs between CM 1 and CM 2. Scene change 3 occurs in the middle of CM 2, and scene change 4 occurs between CM 2 and program 1. Scene change 5 occurs between program 1 and CM 3, scene changes 6 and 7 occur in the middle of CM 3, scene change 8 occurs between CM 3 and CM 4, and scene change 9 occurs at the end of CM 4.

The "range of checksum determination" described in the pattern file of CM 1 is described as being a range from a scene change detected at a position to a next scene change detected next in time. Checksum 1 determined from the entire CM 1 is described as the "checksum".

The "range of checksum determination" described in the pattern file of CM 2 is described as being a range from a scene change detected at a position to a scene change, two scene changes after the first scene change in time. Checksum 2 determined from the entire CM 2 is described as the "checksum".

The "range of checksum determination" described in the pattern file of CM 3 is described as being a range from a scene change detected at a position to a scene change, three scene changes after the first scene change in time. Checksum 3 determined from the entire CM 3 is described as the "checksum".

The "range of checksum determination" described in the pattern file of CM 4 is described as being a range from a scene change detected at a position to a next scene change. Checksum 4 determined from the entire CM 4 is described as the "checksum".

The information processing apparatus 1 detects the scene changes repeatedly. When a scene change is detected, a checksum is determined from a range from the position of the detected scene change to the position of the scene change specified by the "range of checksum determination" described in the selected pattern file.

For example, the pattern file of CM 1 is now selected. When a first scene change is detected, the range from the detected scene change to a next scene change (second scene change) is described as the "range of checksum determination" in the pattern file of CM 1. The information processing apparatus 1 determines the checksum within the range from the first scene change to the second scene change.

If the first scene change is scene change 1 of FIG. 9, the checksum determined within the range from the first scene change to the second scene change (scene change 2) is checksum 1. Checksum 1 matches the checksum described in the pattern file of CM 1. The information processing apparatus 1 identifies the position of the first scene change (scene change 1) as the start position of CM 1, and the position of the second scene change (scene change 2) as the end position of CM 1.

If the first scene change is any scene change other than scene change 1 of FIG. 9, the checksum determined from the first scene change to the second scene change fails to match the checksum described in the pattern file of CM 1. The information processing apparatus 1 does not identify the position of the first scene change as the start position of CM 1. In other words, the information processing apparatus 1 is free from erroneous detection of the position of CM 1.

Similarly, the pattern file of CM 2 is now selected. When one scene change (first scene change) is detected, a range from the detected scene change to a scene change (a third scene change), two scene changes after the detected scene change, is described as the "range of checksum determination" in the pattern file of CM 2. The information processing apparatus 1 determines the checksum from the range from the first scene change to the third scene change.

If the first scene change is scene change 2 of FIG. 9, the checksum determined from the range from scene change 2 to the third scene change (scene change 4) is checksum 2, and matches the checksum described in the pattern file of CM 2. The information processing apparatus 1 identifies the position of the first scene change (scene change 2) as the start position of CM 2 and the position of the third scene change (scene change 4) as the end position of CM 2.

If the first scene change is any scene change other than scene change 2 of FIG. 9, the checksum determined from the first scene change to the third scene change fails to match the checksum described in the pattern file of CM 2. The information processing apparatus 1 does not recognize the position of the first scene change as the start position of CM 2.

The "range of checksum determination" is thus specified by the scene change.

Figure 10:
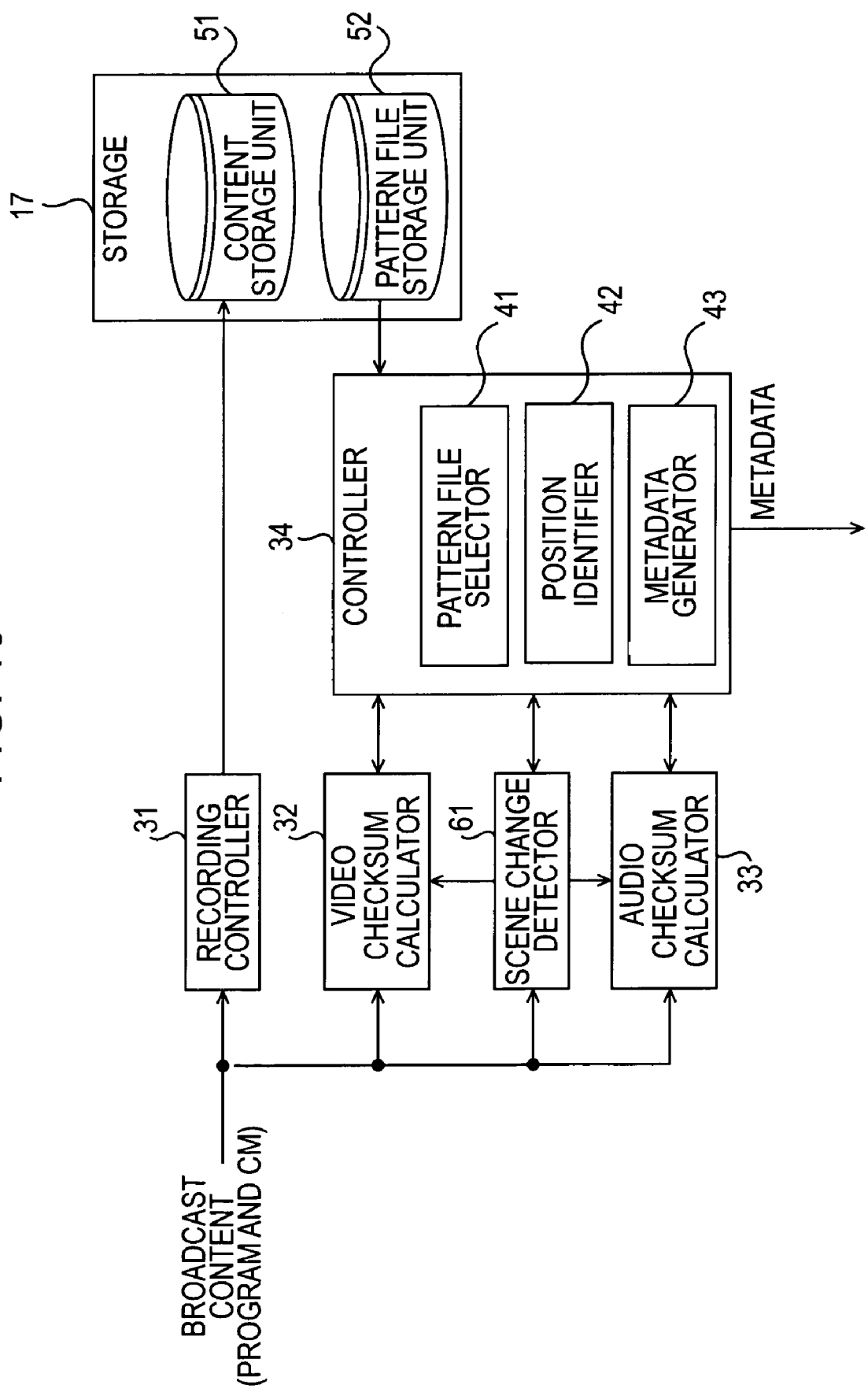
FIG. 10 is a functional block diagram of another information processing apparatus in accordance with one embodiment of the present invention.

FIG. 10 is a functional block diagram of the information processing apparatus 1 in accordance with another embodiment of the present invention.

The information processing apparatus 1 of FIG. 10 is identical in structure to the information processing apparatus 1 of FIG. 3 except that a scene change detector 61 is added. The discussion of elements previously discussed with reference to FIG. 3 is omitted herein.

The scene change detector 61 acquires images (image sequence) of the broadcast content supplied from the content receiver 16 to detect a scene change. In the detection of the scene change, the scene change detector 61 determines whether a change in pixel value of each pixel of images between two consecutive frames is larger than a threshold. Upon detecting a scene change, the scene change detector 61 notifies the video checksum calculator 32, the audio checksum calculator 33, and the pattern file selector 41 in the controller 34 of the detection of the scene change. The notification from the scene change detector 61 contains information relating to the position of the scene change.

When the scene change detector 61 detects the scene change, the video checksum calculator 32 identifies, with respect to the position of the scene change, the range of checksum determination based on the description in the pattern file supplied from the pattern file selector 41. The checksum determined from the identified range is output to the position identifier 42.

When the scene change detector 61 detects the scene change, the audio checksum calculator 33, like the video checksum calculator 32, identifies, with respect to the position of the scene change, the range of checksum determination based on the description in the pattern file supplied from the pattern file selector 41. The checksum determined from the identified range is output to the position identifier 42.

Figure 11:
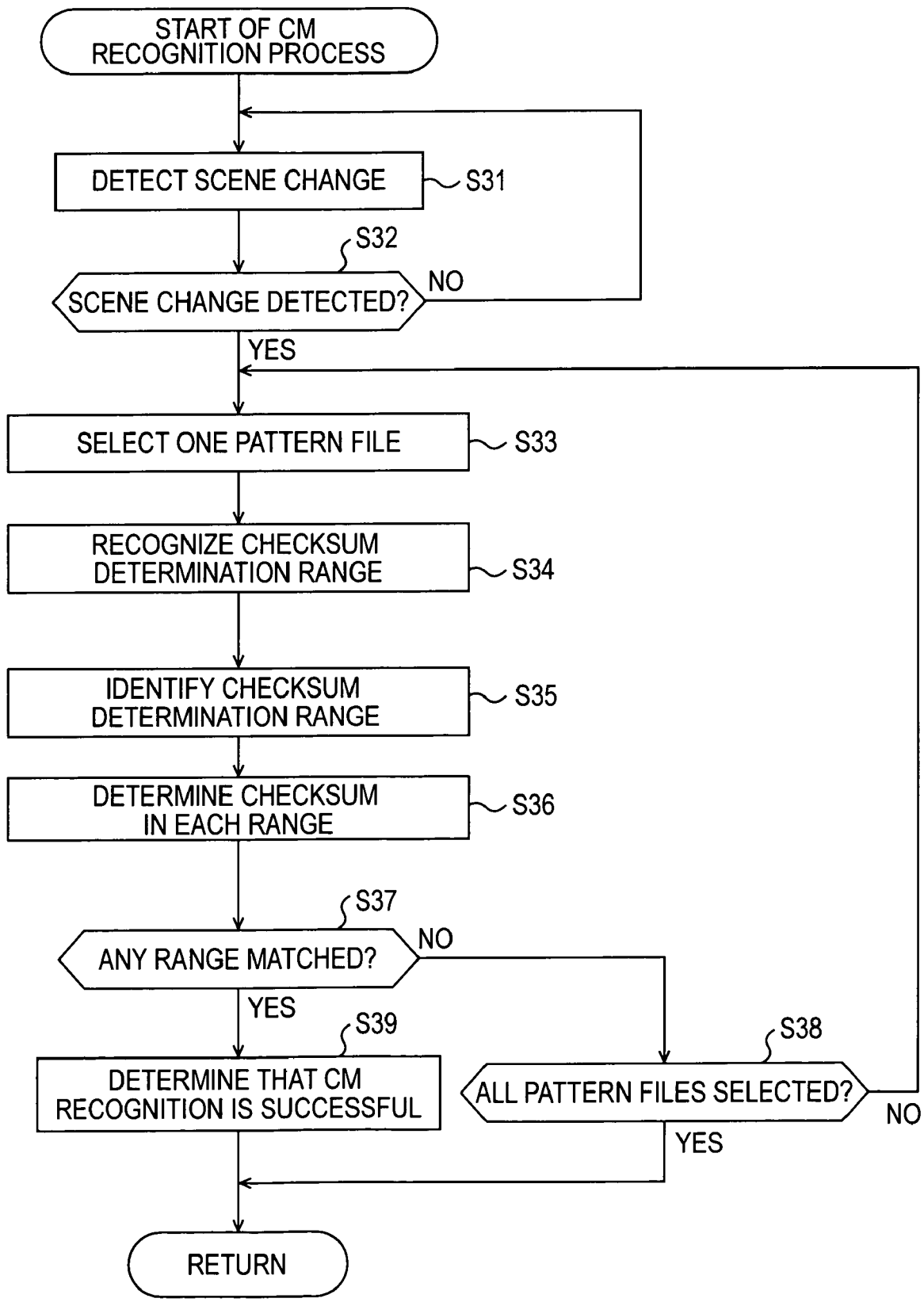
FIG. 11 is a flowchart of a another CM recognition process performed in step S1 of FIG. 5.

The CM recognition process performed by the information processing apparatus 1 of FIG. 10 is described below with reference to a flowchart of FIG. 11. The CM recognition process is performed in step S1 of FIG. 5.

In step S31, the scene change detector 61 detects a scene change. In step S32, the scene change detector 61 determines whether a scene change has been detected.

In step S32, the scene change detector 61 repeats the scene change detection operation until it is determined a scene change has been detected. The process of the video checksum calculator 32 is not performed until a scene change is detected, and workload required to determine the checksum is thus lightened.

When the scene change detector 61 determines in step S32 that the scene change is detected, processing proceeds to step S33. The scene change detector 61 notifies the pattern file selector 41 that the scene change has been detected.

In step S33, the pattern file selector 41 selects one of the pattern files stored in the pattern file storage unit 52, and outputs the selected pattern file to the video checksum calculator 32.

In step S34, the video checksum calculator 32 recognizes the "range of checksum determination" described in the pattern file supplied from the pattern file selector 41. In step S35, the video checksum calculator 32 identifies the range of checksum determination. More specifically, the video checksum calculator 32 identifies the range from the scene change detected in step S31 to the scene change, spaced from the detected scene change by the number of scene changes, specified by the "range of checksum determination", as the range of checksum determination. The scene change detector 61 repeats the detection of the scene change, and successively supplies the video checksum calculator 32 with information relating to the position of the detected scene change.

Upon identifying the range of checksum determination, the video checksum calculator 32 proceeds to step S36 to determine the checksum from the range identified in step S35. If the range extending between two scene changes is identified as a range of checksum determination, the video checksum calculator 32 determines the checksum from each range between every two scene changes. The checksum determined by the video checksum calculator 32 is output to the position identifier 42.

In step S37, the position identifier 42 determines whether the range used to determine the same checksum as the checksum described in the selected pattern file is present among ranges from which the video checksum calculator 32 determines the checksum. If it is determined that no such range is found, processing proceeds to step S38.

In step S38, the pattern file selector 41 determines whether all pattern files have been selected. If it is determined that all pattern files have not been selected, processing returns to step S33 to repeat step S33 and subsequent steps.

If it is determined in step S38 that all pattern files have been selected, the pattern file selector 41 performs step S2 and subsequent steps of FIG. 5.

If it is determined in step S37 that the range used to determine the same checksum as the checksum described in the selected pattern file is present among ranges from which the video checksum calculator 32 determines the checksum, the position identifier 42 proceeds to step S39. The position identifier 42 determines that the CM recognition is successful.

Processing proceeds to step S2 of FIG. 5. After determining that the CM recognition process is successful, the information processing apparatus 1 performs the CM removal process in step S3.

As in the case of FIG. 2, the checksum determined from the entire CM is used in comparison with the checksum determined in the CM recognition process in the case of FIG. 9. When the "range of checksum determination" is specified by the number of scene changes, the checksum determined from a portion of the CM can be used in comparison.

Figure 12:
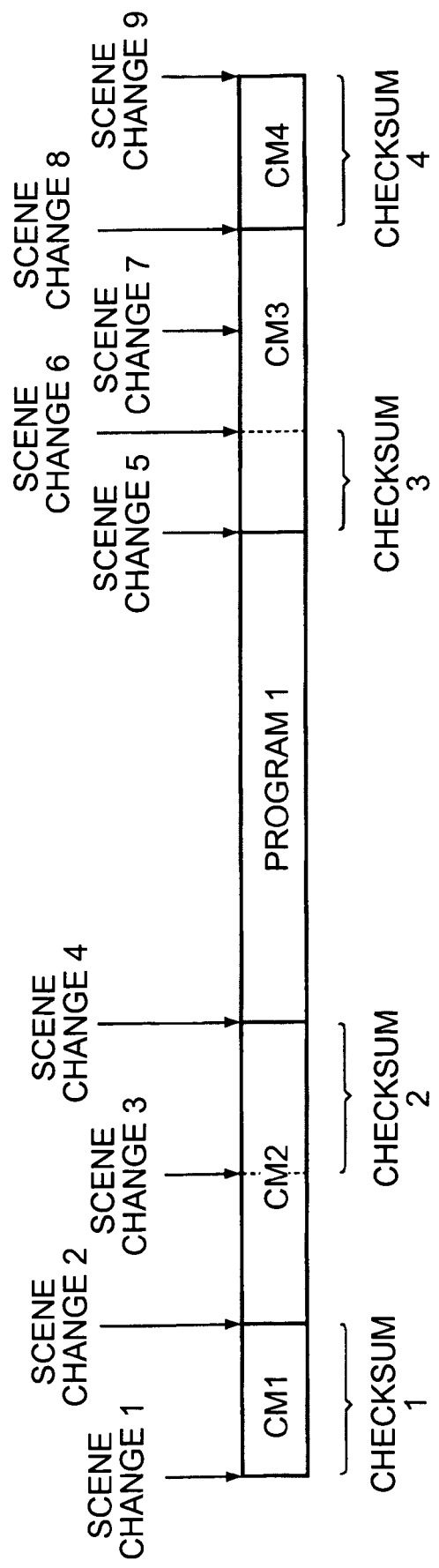
FIG. 12 illustrates still another specific example of the start position and the end position of the CM.

FIG. 12 illustrates another specific example of the CM start position and the CM end position.

The positions of the scene changes of the broadcast content of FIG. 12 are respectively identical to the positions of the scene changes of the broadcast content of FIG. 9.

Unlike the case of FIG. 9, checksum 2 compared to recognize CM 2 (checksum described in the pattern file) is the checksum determined from the range from scene change 3 to scene change 4, out of the range extending between scene change 2 and scene change 4 respectively corresponding to the start position and the end position of CM 2.

Checksum 3 compared to recognize CM 3 is the checksum determined from the range from scene change 5 to checksum 6, out of the range extending between scene change 5 and scene change 8 respectively corresponding to the start position and the end position of CM 3.

Even when the checksum determined from a portion of the range extending between one scene change and the other scene change respectively corresponding to the start position and the end position of the CM is used as the checksum compared to recognize the CM, the information processing apparatus 1 identifies the position of each CM based on the description of the pattern file.

If the checksum determined from the range extending between two scene changes is the checksum compared during the CM recognition as shown in FIG. 12, the information processing apparatus 1 determines the checksum in each range between every two scene changes.

If the pattern file of CM 2 is selected, checksum 2 described in the pattern file matches the checksum determined from the range extending between scene change 3 and scene change 4. The information processing apparatus 1 recognizes the range from scene change 3 to scene change 4 as whole or part of CM 2.

The position of the scene change, one scene change earlier in time than front one (scene change 3) of two scene changes defining the range from which checksum 2 is determined, is described as the start position of CM in the pattern file of CM 2. The information processing apparatus 1 thus identifies the position of scene change 2 earlier in time by one scene change than scene change 3 as the start time of CM 2.

The position of later one (scene change 4) of two scene changes defining the range from which checksum 2 is determined, is described as the end position of CM 2 in the pattern file of CM 2. The information processing apparatus 1 thus identifies the position of scene change 4 as the end position of CM 2.

In the above discussion, the scene change defines the range of the checksum. The range of checksum determination can be defined by a mute period present in the broadcast content. In this case, the information processing apparatus 1 detects all mute periods present in the broadcast content, and determines the checksum from the range defined by the number of mute periods in the pattern file.

The CM start position and the CM end position described in the pattern file are represented with respect to the position of the range of checksum determination. Alternatively, the CM start position and the CM end position can be represented with respect to the position of the scene change.

In the above discussion, the position of the CM is identified in the CM recognition by image and the CM recognition by audio. By combining the CM recognition by image and the CM recognition by audio, the CM recognition accuracy level is heightened.

For example, a score representing the results of the CM recognition by image and a score representing the result of the CM recognition by audio are summed, and the information processing apparatus 1 determines whether the resulting sum is higher than a predetermined threshold. If the sum is above the predetermined threshold, the information processing apparatus 1 determines that the CM recognition is successful.

Figure 13:
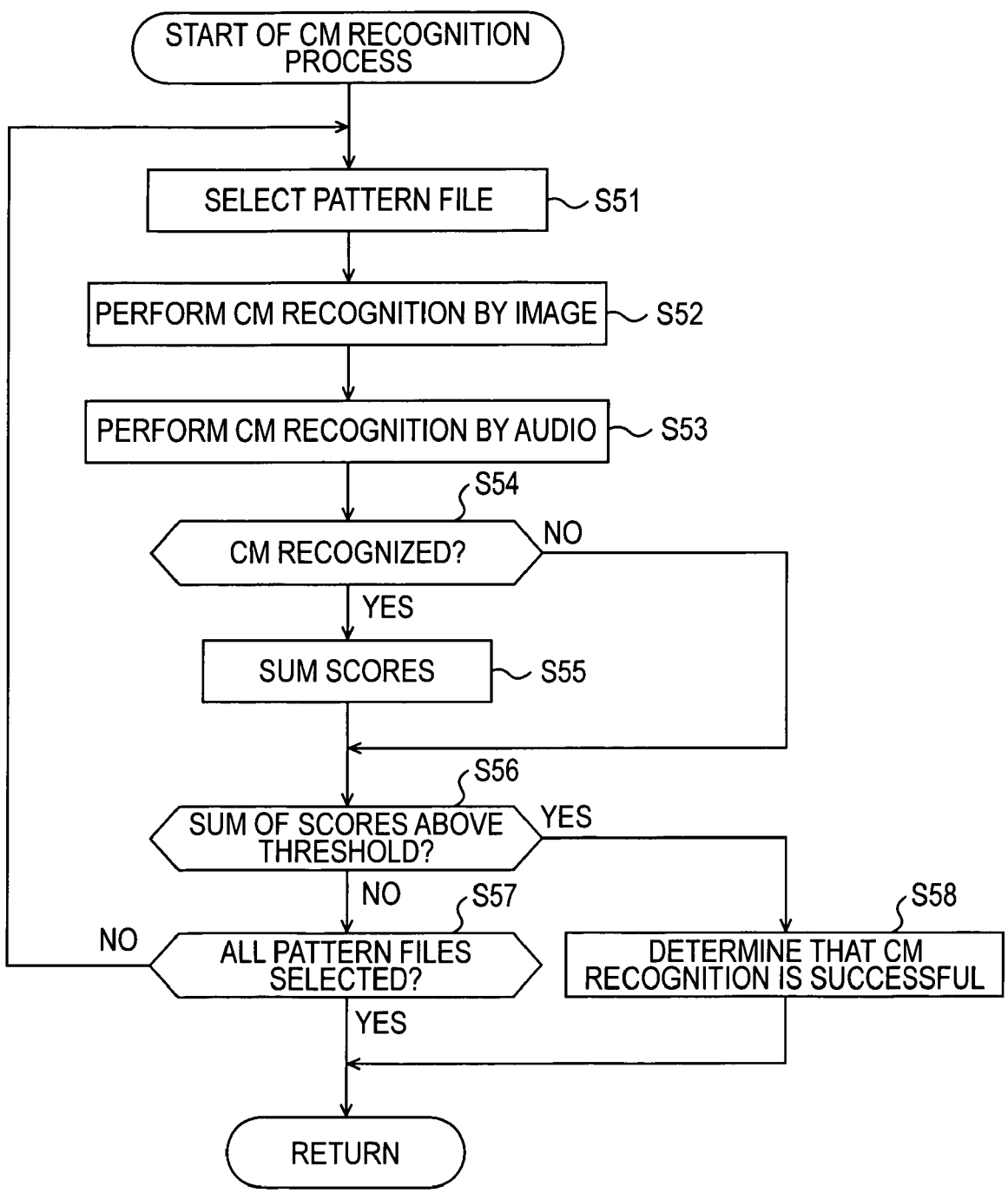
FIG. 13 is a flowchart illustrating a CM recognition process performed in step S1 of FIG. 5.

The CM recognition process of the information processing apparatus 1 is described below with reference to a flowchart of FIG. 13. In this CM recognition process, the CM recognition by image and the CM recognition by audio are combined.

In step S51, the pattern file selector 41 selects a pattern file for the CM recognition by image, and outputs the selected pattern file to the video checksum calculator 32. The pattern file selector 41 also selects a pattern file for the CM recognition by audio, and outputs the selected pattern file to the audio checksum calculator 33. The pattern file supplied to the video checksum calculator 32 and the pattern file supplied to the audio checksum calculator 33 are related to the same CM.

In step S52, the video checksum calculator 32 performs the CM recognition process as previously discussed with reference to FIGS. 2, 8, 9, and 12. The scores of the recognition results calculated by the video checksum calculator 32 are output to the position identifier 42 in the controller 34.

In step S53, the audio checksum calculator 33 performs the CM recognition by audio. The score of the recognition results calculated by the audio checksum calculator 33 is also output to the position identifier 42.

In step S54, the position identifier 42 determines, based on the scores supplied from the video checksum calculator 32 and the audio checksum calculator 33, whether the CM is recognized in both image and audio. If it is determined that the CM is recognized, processing proceeds to step S55. If it is determined that the CM is not recognized, step S55 is skipped.

In step S55, the position identifier 42 sums the score supplied from the video checksum calculator 32 and the score supplied from the audio checksum calculator 33, and proceeds to step 56. The position identifier 42 determines whether the score sum is above the predetermined threshold.

If it is determined in step S56 that the score sum is not above the predetermined threshold, processing proceeds to step S57. The position identifier 42 determines whether all pattern files have been selected.

If it is determined in step S57 that not all pattern files have been selected, the position identifier 42 returns to step S51 to repeat step S51 and subsequent steps. If it is determined in step S57 that all pattern files have been selected, processing ends.

If it is determined in step S56 that the score sum is above the predetermined threshold, processing proceeds to step S58 to determine that the CM recognition is successful. Processing proceeds to step S2 of FIG. 5.

By combining the CM recognition results provided by the video checksum calculator 32 and the CM recognition results provided by the audio checksum calculator 33, the overall CM recognition accuracy level is heightened even if individual recognition accuracy level is not so much reliable.

The pattern file stored in the pattern file storage unit 52 can be updated with a pattern file that is regularly downloaded from a server. The data of CM broadcasting is changing from day to day. If the server prepares and downloads the update pattern file of the CM, the user can remove the newly broadcast CM from the broadcast content by downloading the update pattern file and handle the program and the CM separately.

Figure 14:
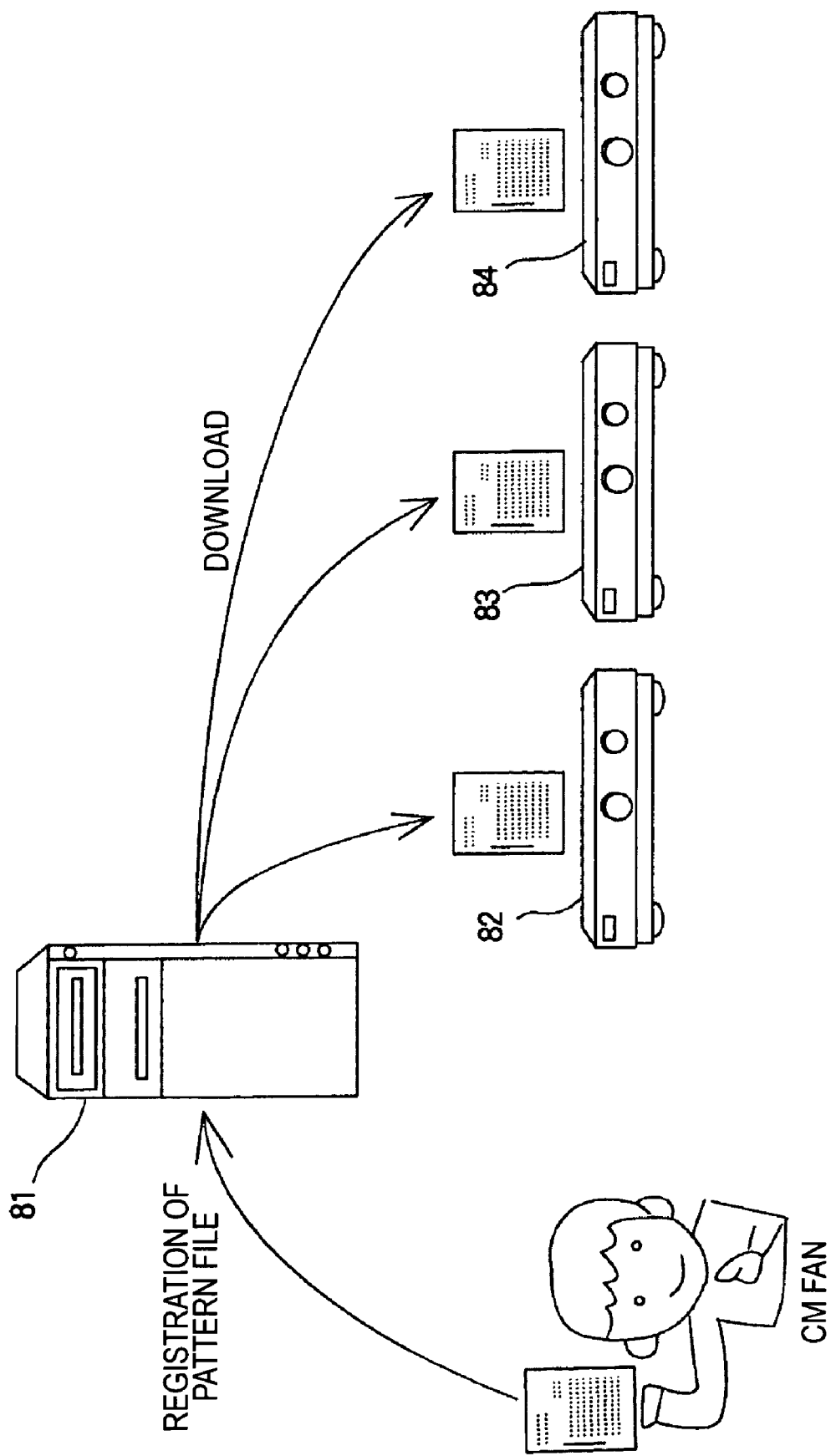
FIG. 14 illustrates a down-load system of a pattern file.

FIG. 14 illustrates the concept of a download system of the pattern file.

For example, a CM fan generates a pattern file for a CM using the broadcast content recorded on the CM fan's own personal computer. If an application program for determining a checksum is installed in the personal computer, the fan determines the checksum of whole or part of the CM after determining the CM start position and the CM end position. The fan easily produces the pattern file by specifying the relationship between the range of checksum determination and the start position and the end position of the CM (for example, the start position and the end position of the CM with respect to the range of checksum determination).

Pattern files produced by many CM fans are registered in a server 81. The server 81 thus registers a variety of pattern files including update CMs.

Information processing apparatuses 82 through 84, each having the same structure as the information processing apparatus 1, download the pattern files from the server 81 with a predetermined period and stores the pattern files that can be used to remove a variety of CMs.

Not only the CM fans but also service providers can produce the pattern files so that the pattern files are downloaded from the server 81.

Figure 15:
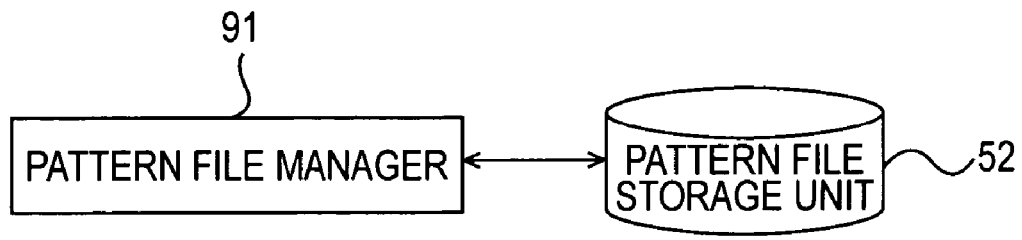
FIG. 15 is a functional block diagram of an information processing apparatus in accordance with another embodiment of the present invention.

FIG. 15 is a functional block diagram illustrating the information processing apparatus 1 that manages downloading of the pattern file. The functional blocks of FIG. 15 are embodied by the CPU 11 of FIG. 1 that executes the predetermined program.

A pattern file manager 91 controls the communication unit 18 of FIG. 1, thereby accessing the server 81 via a network at a predetermined timing to download a pattern file not stored in the pattern file storage unit 52. The pattern file downloaded to the drive 19 is stored on the pattern file storage unit 52.

At predetermined timings, the pattern file manager 91 can successively delete pattern files of CMs no longer broadcast and not contained in a broadcast content stored in the content storage unit 51. This operation prevents the capacity of the storage 17 from being uselessly consumed by unused pattern files.

Figure 16:
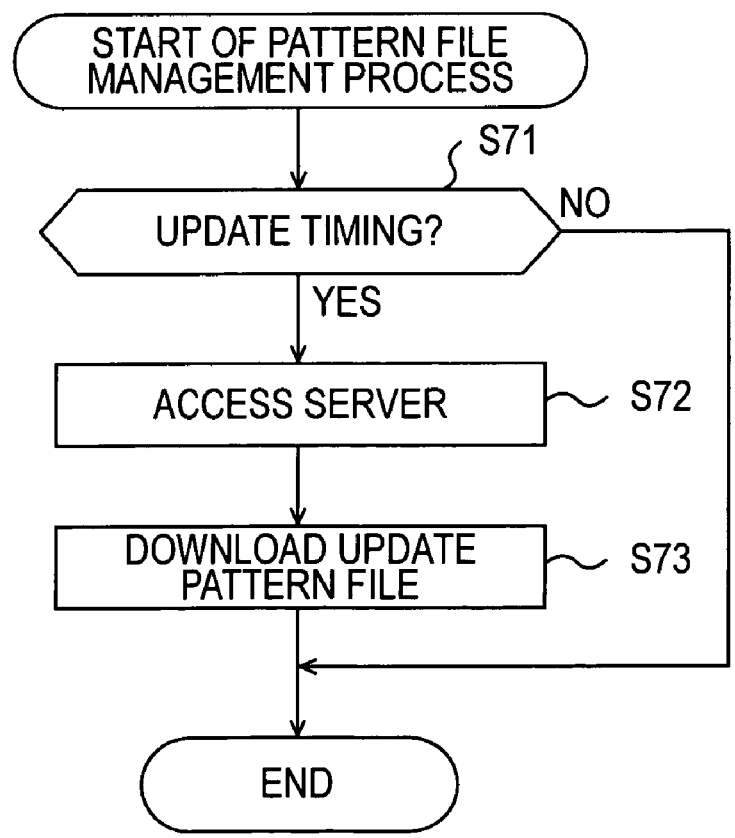
FIG. 16 is a flowchart illustrating a pattern file management process of the information processing apparatus.

A pattern file management process performed by the pattern file manager 91 is described below with reference to a flowchart of FIG. 16.

In step S71, the pattern file manager 91 determines whether it is timing to update the pattern file. If it is determined in step S71 that it is not timing to update the pattern file, processing ends. The pattern file manager 91 updates the pattern files at a predetermined timing, for example, once every day, or once every week.

If it is determined in step S71 that it is timing to update the pattern files, the pattern file manager 91 proceeds to step S72 to access the server 81.

In step S73, the pattern file manager 91 downloads update pattern files from the server 81, and causes the pattern file storage unit 52 to store the downloaded pattern files.

Since the pattern files of the update CMs are stored in the pattern file storage unit 52, even update CM can be removed from the broadcast content.

In the above discussion, the information representing the CM start position and the CM end position is described with respect to the range of checksum determination in the pattern file. Alternatively, the CM start position and a difference between the start position and the end position of the CM can be described.

For example, if information representing the number of frames or time between the start position and the end position is described, the information processing apparatus 1 can identify the end position from the identified CM start position. Conversely, the end position with respect to the range of checksum determination and the difference between the end position and the start position can be described.

In the above discussion, the positions forming the image sequence, such as the CM start position and the CM end position, are mainly identified by the head and tail of the GOPs. Alternatively, the positions of the image sequence can be identified by each of the number of frames, the number of fields, and time. In moving images compressed in compliance with a variety of compression standards including enhanced versatile disk (EVD), the position of a CM is identified based on information representing the position of an image used in the compression standard.

The pattern file is used not only to skip a CM and to cause the removable medium 20 to store a television program without the CM but also to collect CMs.

In the above discussion, the pattern file is prepared to remove the CM. The pattern file can be prepared to remove the television program itself. In this case, the checksum determined from whole or part of a television program, and the start position and the end position of the television program with respect to the range from which the checksum has been determined are described in the pattern file.

In the above discussion, the range of checksum determination is defined by one of the GOP and the scene change. Alternatively, the range of checksum determination can be defined by the number of bits of a fixed length, the number of bytes of a fixed length, the number of frames, or the number of fields.

The above-references series of steps can be performed by not only software, but also hardware.

If the series of steps is performed by software, a program forming the software is installed from a recording medium or via a network onto a computer incorporated into a hardware structure or to a general-purpose computer, for example.

The recording media include the removable medium 20 of FIG. 1 storing the program and supplied separate from the apparatus to supply the user with the program. The recording media include a magnetic disk (including a flexible disk), an optical disk (such as a compact disk read-only memory (CD-ROM) and a digital versatile disk (DVD)), a magneto-optic disk such as MD® (Mini Disk), and a semiconductor memory. The recording media also include the ROM 12 and a hard disk included in the storage 17, each storing the program and supplied in the apparatus to the user.

The process steps discussed in this specification are sequentially performed in the time sequence order as stated. Alternatively, the steps may be performed in parallel or separately.

In this specification, the word system refers to one or a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    selecting means for selecting removal information concerning contents to be removed from among a plurality of contents organized in time sequence, the removal information prepared on a per content basis for the contents to be removed and including a value uniquely determined from data within a data range of whole or part of a content to be removed, a first range that is the data range from which the value is determined, and a second range larger than and including the first range that is a removal range represented by the position of the first range;
    first detecting means for detecting a range at a predetermined position within the whole content, having the same range as the first range contained in the removal information selected by the selecting means and the same value as the value uniquely determined and contained in the removal information; and
    removing means for removing a predetermined content based on the second range contained in the removal information selected by the selecting means if the first detecting means detects the range at the predetermined position.

2. The information processing apparatus according to claim 1, further comprising generating means for generating metadata representing the position of the predetermined content removed by the removing means from the contents.

3. The information processing apparatus according to claim 1, wherein the content to be removed includes a commercial contained in a television broadcast content.

4. The information processing apparatus according to claim 1, further comprising second detecting means for detecting one of a scene change and a mute period,
    wherein the first range contained in the removal information is represented by one of the number of scene changes and the number of mute periods, and wherein if one of the scene change and the mute period is detected by the second detecting means, the first detecting means detects the range at the predetermined position of the whole content, having the same range as the first range represented one by the number of scene changes and the number of mute periods and the same value as the value uniquely determined and contained in the removal information.

5. The information processing apparatus according to claim 1, further comprising storage means storing the removal information.

6. The information processing apparatus according to claim 5, further comprising update means for updating the removal information stored in the storage means by downloading removal information from a server connected via a network.

7. An information processing method, comprising steps of:
    selecting removal information concerning contents to be removed from among a plurality of contents organized in time sequence, the removal information prepared on a per content basis for the contents to be removed and including a value uniquely determined from data within a data range of whole or part of a content to be removed, a first range that is the data range from which the value is determined, and a second range larger than and including the first range that is a removal range represented by the position of the first range;
    detecting a range at a predetermined position within the whole content, having the same range as the first range contained in the removal information selected in the selecting step and the same value as the value uniquely determined and contained in the removal information; and
    removing a predetermined content based on the second range contained in the removal information selected in the selecting step if the range at the predetermined position is detected in the detecting step.

8. A non-transitory computer readable storage medium storing thereon a computer program for causing a computer to process information, comprising program code for performing steps of:
    selecting removal information concerning contents to be removed from among a plurality of contents organized in time sequence, the removal information prepared on a per content basis for the contents to be removed and including a value uniquely determined from data within a data range of whole or part of a content to be removed, a first range that is the data range from which the value is determined, and a second range larger than and including the first range that is a removal range represented by the position of the first range;
    detecting a range at a predetermined position within the whole content, having the same range as the first range contained in the removal information selected in the selecting step and the same value as the value uniquely determined and contained in the removal information; and
    removing a predetermined content based on the second range contained in the removal information selected in the selecting step if the range at the predetermined position is detected in the detecting step.

9. An information processing apparatus, comprising:
    a selector selecting removal information concerning contents to be removed from among a plurality of contents organized in time sequence, the removal information prepared on a per content basis for the contents to be removed and including a value uniquely determined from data within a data range of whole or part of a content to be removed, a first range that is the data range from which the value is determined, and a second range larger than and including the first range that is a removal range represented by the position of the first range;
    a detector detecting a range at a predetermined position within the whole content, having the same range as the first range contained in the removal information selected by the selector and the same value as the value uniquely determined and contained in the removal information; and
    a remover removing a predetermined content based on the second range contained in the removal information selected by the selector if the detector detects the range at the predetermined position.

* * * * *